(12) United States Patent
Zinsmeyer et al.

(10) Patent No.: US 11,188,301 B2
(45) Date of Patent: Nov. 30, 2021

(54) SALTING TEXT AND FINGERPRINTING IN DATABASE TABLES, TEXT FILES, AND DATA FEEDS

(71) Applicant: LiveRamp, Inc., San Francisco, CA (US)

(72) Inventors: Charles Zinsmeyer, Llano, TX (US); Tsz Ling Christina Leung, Foster City, CA (US); Matt LeBaron, Salinas, CA (US); Martin Rose, Superior, CO (US); Ray Kraus, Rochester, NY (US); Arthur Coleman, Carmel Valley, CA (US); Michael Anderson, Conway, AR (US)

(73) Assignee: LiveRamp, Inc., San Francisco, CA (US)

( * ) Notice: Subject to any disclaimer, the term of this patent is extended or adjusted under 35 U.S.C. 154(b) by 575 days.

(21) Appl. No.: 15/999,100

(22) PCT Filed: Feb. 16, 2017

(86) PCT No.: PCT/US2017/018037
§ 371 (c)(1),
(2) Date: Aug. 17, 2018

(87) PCT Pub. No.: WO2017/142981
PCT Pub. Date: Aug. 24, 2017

(65) Prior Publication Data
US 2021/0026598 A1    Jan. 28, 2021

Related U.S. Application Data (60) Provisional application No. 62/297,027, filed on Feb. 18, 2016.

(51) Int. Cl.
*G06F 7/00* (2006.01)
*G06F 7/08* (2006.01)
(Continued)

(52) U.S. Cl.
CPC .............. *G06F 7/08* (2013.01); *G06F 16/122* (2019.01); *G06F 21/604* (2013.01)

(58) Field of Classification Search
None
See application file for complete search history.

(56) References Cited

U.S. PATENT DOCUMENTS

| | | | |
|---|---|---|---|
| 5,745,900 A * | 4/1998 | Burrows | ................. G06F 16/30 |
| 7,047,422 B2 | 5/2006 | Benaloh | |

(Continued)

FOREIGN PATENT DOCUMENTS

| | | |
|---|---|---|
| CN | 105205355 A | 12/2015 |
| KR | 20090100045 A | 11/2010 |

(Continued)

OTHER PUBLICATIONS

International Search Report and Written Opinion for Int'l App. No. PCT/US2017/018037 (dated Apr. 24, 2017).

(Continued)

*Primary Examiner* — Farhan M Syed (57) ABSTRACT

A system and method for salting and fingerprinting database tables, text files, data feeds, and the like, first resorts the data according to a field or fields in the data set. A salting recipe is selected and applied to the sorted data. A fingerprint of the data is captured after sorting and salting. The data is then restored to its original order before being sent to a trusted third party. Because the data owner retains information concerning the sorting sorting sonar technique, salting technique, and the fingerprint, the data owner can reconstruct the unsalted file from the salted file, and can determine if a wild file contains data from the data file. The salting is difficult to detect by the bad actor, even if the bad actor is aware that the data has been salted.

15 Claims, 3 Drawing Sheets

(51) Int. Cl.
*G06F 16/11* (2019.01)
*G06F 21/60* (2013.01)

(56) References Cited

U.S. PATENT DOCUMENTS

| | | | |
|---|---|---|---|
| 7,184,571 | B2 | 2/2007 | Wang et al. |
| 7,617,231 | B2 | 11/2009 | Moon et al. |
| 7,730,037 | B2 | 6/2010 | Jajodia et al. |
| 7,930,546 | B2 | 4/2011 | Rhoads et al. |
| 8,014,557 | B2 | 9/2011 | Alattar et al. |
| 8,059,858 | B2 | 11/2011 | Brundage et al. |
| 8,099,415 | B2 * | 1/2012 | Luo ................. G06F 16/258 707/736 |
| 8,107,129 | B2 * | 1/2012 | Yang ................. H04N 1/32219 358/3.28 |
| 8,126,918 | B2 | 2/2012 | Levy |
| 8,250,085 | B1 | 8/2012 | Satish |
| 8,359,472 | B1 * | 1/2013 | Ren ................. G06F 16/9014 713/176 |
| 8,412,755 | B2 | 4/2013 | Stephenson et al. |
| 8,621,244 | B1 * | 12/2013 | Rembert ............. G06F 21/6245 713/193 |
| 8,850,596 | B2 | 9/2014 | Ramakrishnan |
| 9,087,459 | B2 | 7/2015 | Georgiev et al. |
| 9,130,972 | B2 | 9/2015 | Barkan et al. |
| 9,171,173 | B1 * | 10/2015 | Rogers ............... H04L 9/0643 |
| 9,330,095 | B2 * | 5/2016 | Fedorenko ............ G06F 16/40 |
| 9,514,312 | B1 | 12/2016 | Antoun et al. |
| 2003/0135519 | A1 * | 7/2003 | Frame ................. G06F 16/258 |
| 2006/0028689 | A1 * | 2/2006 | Perry ................. H04N 1/32144 358/3.28 |
| 2006/0095775 | A1 * | 5/2006 | Jajodia ............. G06F 16/24553 713/176 |
| 2006/0150153 | A1 * | 7/2006 | Altman .................. G06F 21/51 717/116 |
| 2010/0186067 | A1 * | 7/2010 | Stephenson ............. G06F 21/10 726/4 |
| 2014/0157439 | A1 | 6/2014 | Ayzenshtat et al. |
| 2014/0279956 | A1 * | 9/2014 | Trimble ................ G06F 3/0608 707/692 |
| 2015/0135327 | A1 | 5/2015 | Wall |
| 2017/0235749 | A1 * | 8/2017 | Beaverson .......... G06F 16/9017 707/747 |

FOREIGN PATENT DOCUMENTS

| | | |
|---|---|---|
| WO | 2013138714 A1 | 9/2013 |
| WO | 2014055871 A2 | 4/2014 |

OTHER PUBLICATIONS

Udai Pratap Rao et al. "Relational Database Watermarking for Ownership Protection," Procedia Technology, vol. 6 (Jan. 1, 2012).
Radu Sion et al., "Rights Protection for Relational Data," Sigmod 2003 (Jun. 9, 2003).
Wikipedia entry for "Salt (Cryptography)" (Jun. 25, 2019).
Supplementary European Search Report for EP 17753779.2 (Jul. 31, 2019).
Jalil et al., "Content based Zero-Watermarking Algorithm for Authentication of Text Documents," IJCSIS vol. 7, No. 2 (Feb. 2010).
Machine translation of CN105205355 A, patent application publication.
Sion, Radu, "Proving Ownership over Categorical Data," ICDE (2004).
Pandely, Nikita et al., "Alternative Shift Algorithm fo rDigital Watermarking on Text," Int'l J. of Scientific and Rsch. Pubs., vol. 2, Issue 10 (Oct. 2012).
Sion, Radu et al., "Rights Protection for Relational Data," IEE Trans. on Knowledge and Data Eng., vol. 16, No. 12 (Dec. 2004).
Chang, Chin-Chen et al., "A Blind Reversible Robust Watermarking Scheme for Relational Databases," The Scientific World Journal, vol. 13, Article ID 717165 (2013).
Bowen, Ted Smalley, "Watermarks Hide in Plain Sight," TRNmag.com (Jun. 6, 2001).
Agrawal, Rakesh et al., "Watermarking relational data: framework, algorithms and analysis," the VLDB Journal (2003).
Zhang, Yong, "A Method of Protecting Relational Databases Copyright with Cloud Watermark," Int'l J. of Computer, Electrical, Automation, Control and Info. Eng., vol. 1, No. 3 (2007).
Shu, Xiaokui et al., "Fast Detection of Transformed Leaks," IEE Trans. on Info. Forensics and Security, vol. 11, No. 3 (Mar. 2016).
Whittaker, Zack, "When stolen data turns up on the dark web, this tech can find it fast," ZDNet (Jun. 3, 2015).

* cited by examiner

SALTING TEXT AND FINGERPRINTING IN DATABASE TABLES, TEXT FILES, AND DATA FEEDS

CROSS-REFERENCE TO RELATED APPLICATIONS

This application is a national-phase entry of international patent application no. PCT/US2017/018,037, filed on Feb. 16, 2017, which in turn claimed priority to U.S. provisional patent application No. 62/297,027, filed on Feb. 18, 2016. Such applications are incorporated herein by reference.

TECHNICAL FIELD

The field of the invention is the salting of data and fingerprinting of data sets to determine if data has been inappropriately copied or used. Salting is the mechanic of inserting unique data (salt) into a subset of data so that, in the case that the data is leaked, the data contained in the subset of data may be identified back to the data owner. Fingerprinting is the process of producing from a data set a much shorter set, its fingerprint that nevertheless identifies the original data set.

BACKGROUND ART

Data leakage may be defined as the surreptitious use of data by someone other than an owner or authorized user. The financial impact of data leakage is estimated to be in the hundreds of millions of dollars annually worldwide, and thus represents a very significant problem in the data services industry. Solutions attempting to prevent data leakage have existed for some time. These solutions prevent data from leaking outside an organization's firewall, or encrypt it when it leaves the firewall and moves on open networks "on the wire." Solutions have also existed for asserting ownership of graphical, video, audio, or document (i.e., text or pdf) data once that data is actually exposed in the clear outside the firewall; organizations use these "digital watermarking" solutions, as they are known, to protect their data from misuse. (The term "watermarking" is borrowed from print media, where watermarks consist of imprinting images or patterns on printed documents to verify authenticity, whereas a digital watermark is a kind of marker embedded in a digital file to serve the same purpose.) Watermarks allow the data owner to recover damages for unlicensed use, because they can use the watermark in a court of law as evidence of ownership and copyright infringement. At the same time, the fact that such legal remedies exist deters individuals or groups hoping to acquire and then use that copyrighted material for free.

Sadly, data leakage of text and database files, whether passed in the clear or decrypted at the point of use, has remained an unsolved problem. Owners of consumer data ("Data Owners") often give, lease, or sell their data to individuals or organizations ("Trusted Third Parties" or "TTPs") that are trusted to use that data only in a legal fashion, following contractual requirements or data-handling regulations, such as Regulation B in financial services or privacy laws set by local, state or federal governments. This data is usually transmitted as a series of database tables (e.g., .sql format), text files (e.g., .csv, .txt, .xls, .doc, and .rtp format), or as a real-time data feed (e.g., XML or JSON). Despite this, it often occurs that the Data Owner's data leaks (the leaked file is defined herein as a "Leaked Subset") into the hands of others ("Bad Actors") who either knowingly or unknowingly use the data without proper permission or even illegally. This can happen because, for example, a TTP knowingly releases the data and is itself a Bad Actor; an employee of the TTP knowingly or accidentally releases the data; or an employee of the Data Owner itself knowingly or unknowingly leaks the data.

Watermarking of databases, text files or real-time data feeds (e.g., XML or JSON) presents unique challenges. Images, videos or audio files are dense and highly structured. It is easy to embed a small amount of data as a watermark in these files without degrading the file's information content or user experience, because these types of files are noise resistant. A noise resistant file is one in which a bit of noise (such as a watermark) can be added without degrading the resulting data; for example, watermarks can be added to video files by altering a few bits of data or altering the order of adjacent frames without the viewer noticing the change. At the same time, the highly-structured nature of this type of data makes it difficult for a Bad Actor to remove the watermark. Database, text files or real-time data feeds (e.g., XML or JSON), by comparison, are relatively lightweight, and thus are intolerant to the introduction of noise. For example, changing even a single character in a name or address may cause the data in that record to be useless. The structure of this type of data can easily be manipulated in ways (e.g., reordering columns, appending rows, deleting rows) that make a watermark fragile, easy to detect, and therefore easy to make unrecognizable to the party seeking to establish that the data has been improperly used. For example, elements within a data table can be altered; data can be merged with data from other data sources; and data can be divided into subsets and/or rearranged and manipulated in other ways to avoid detection. As a result, significant obstacles exist for a Data Owner who wants to assert ownership of a database or text file (or its JSON or XML equivalent) and/or detect the party responsible for leaking the data. Nor can a Data Owner easily recover lost revenue through action at law, because it lacks proof of the wrongful conduct that meets applicable evidentiary standards. Moreover, current methods for detecting data leaks are primarily through manual operations and are thus time-consuming, labor-intensive, expensive, and error-prone. An improved system and method of watermarking or "salting" these types of files would thus be of great benefit.

DISCLOSURE OF INVENTION

The invention is directed to a method for salting (or applying a watermark) to database tables, text files, data feeds (e.g., XML or JSON), and like data. In certain implementations of the invention, the data set is first resorted according to a field or fields in the data set. A salting recipe (which may be selected from a group of available salting recipes) is applied to the sorted data. A fingerprint of the data is then captured after sorting and salting. The data is then restored to its original order before being sent to a TTP. Because the Data Owner retains, for each file and in some implementations each release of a file, information concerning the sorting technique, salting technique, and the fingerprint, the Data Owner can reconstruct the unsalted file from the salted file. Furthermore, the data contained in the Leaked Subset, even if altered, can be identified by the Data Owner as having been given to a specific recipient and a particular file the recipient received. This process of identifying the specific Leaked Subset and Bad Actor from a Wild File acquired from a third party is referred to as Guilt Assignment. Guilt Assignment allows the Data Owner to build a strong evidentiary case by which to prosecute the Bad Actor, based on the salting of the data. The salting is difficult to detect by the Bad Actor, and thus difficult or impossible for the Bad Actor to remove, even if the Bad Actor is aware that the data has been or may have been salted. The salting thus reduces the likelihood that a potential Bad Actor will in fact improperly use data that it has acquired in the first place, knowing that such improper use could be detected and result in legal action.

These and other features, objects and advantages of the present invention will become better understood from a consideration of the following detailed description of the preferred embodiments and appended claims in conjunction with the drawings as described following:

BEST MODE FOR CARRYING OUT THE INVENTION

Before the present invention is described in further detail, it should be understood that the invention is not limited to the particular embodiments and implementations described, and that the terms used in describing the particular embodiments and implementations are for the purpose of describing those particular embodiments and implementations only, and are not intended to be limiting, since the scope of the present invention will be limited only by the claims.

To begin a discussion of certain implementations of the invention, the precise definition of the associated technical statement is presented as follows. Let D be a database, including but not limited to a flat file or data feed, owned by Company C. D consists of tuples in relational form or any structured text (e.g., .csv, XML, JSON, or SQL data). Let $S_i$ be a subset of tuples from D. Let M be a unique method to generate W, a representation of D or $S_i$ that is much smaller than D. The goal then is to generate a W such that:

1. W contains a "watermark" for a given M (i.e., M cannot generate the same W for two different Ds or $S_i$s).
2. W can, with statistical confidence, determine that an Agent $A_1$ is a Bad Actor distributing or altering D or $S_1$ versus other Agents $A_2, A_3, \ldots A_n$ who receive a copy of D or a different $S_1$ that partially overlaps $S_1$.
3. W would be sufficiently robust to meet evidentiary standards to prove that D', a second copy or subset of D, was created without the consent of C. This means that the probability of a false negative (identifying D' as being illegitimate when it is not) or a false positive (identifying D' as legitimate when it is not) must be small.
4. W must cause no loss of information from D or $S_i$ at the time they are generated for a specific $A_i$.
5. If M embeds W in D, recovery of W is blind. That is, W can be obtained from D' without knowledge of D if and only if D' and D, or exact duplicate S and S' taken from D and D' respectively, are equivalent.
6. The process by which W is created must be robust enough to deal with significant differences in tuples (e.g., extra blank spaces, data resorting, tuple deletion, tuple addition) between D and D' without generating a false negative.
7. M must take into account that a $D_i$ from C is updated on a regular basis, becoming $D_j$ and allow for the ability to distinguish $D_i$ from $D_j$.
8. M must be computationally feasible with readily available computing equipment.
9. M does not have to identify exactly what changes were made to D or $S_i$ when it becomes D' or $S_i'$, although detailed examination of D' or $S_i'$ can and should provide supporting evidence for W as an indicator of the Bad Actor status of $A_i$.

By implementing the salting method described herein that meets these requirements, Data Owners can more frequently identify data within a Wild File as having originated from their own data set and even identify to which TTP that data was originally sent. This is done by analyzing certain data elements within the Wild File, to determine if an identifier (the "Salt"), unique to the recipient and subtly embedded in the Leaked Data Set from which some amount of data in the Wild File originated, can be discovered. This Salt cannot be detected without foreknowledge of the salting mechanism as, to the untrained eye, it is invisible.

The workings and output of the system as described above can be illustrated by FIG. 1, showing the method of salting a file according to certain implementations of the system. Suppose that, in a first example, an original data set 10 contains the following elements, as shown in Table 1 (actual data sets are likely to be far larger, but a very small data set is shown for purposes of example):

TABLE 1

| # | Col A | Col B | Col C | Col D | Col E | Col F | Col G | Col H |
|---|-------|-------|-------|-------|-------|-------|-------|-------|
| 1 | Sunny | D | Very Large | 6970 | Monday | Red | TX | Orange |
| 2 | Rainy | G | Large | 2211 | Tuesday | Yellow | TX | Apple |
| 3 | Cloudy | H | Medium | 209 | Wednesday | Green | TX | Grape |
| 4 | Windy | E | Small | 2301 | Thursday | Blue | TX | Lemon |
| 5 | Calm | M | Very Small | 708 | Friday | White | TX | Lime |

Figure 1:
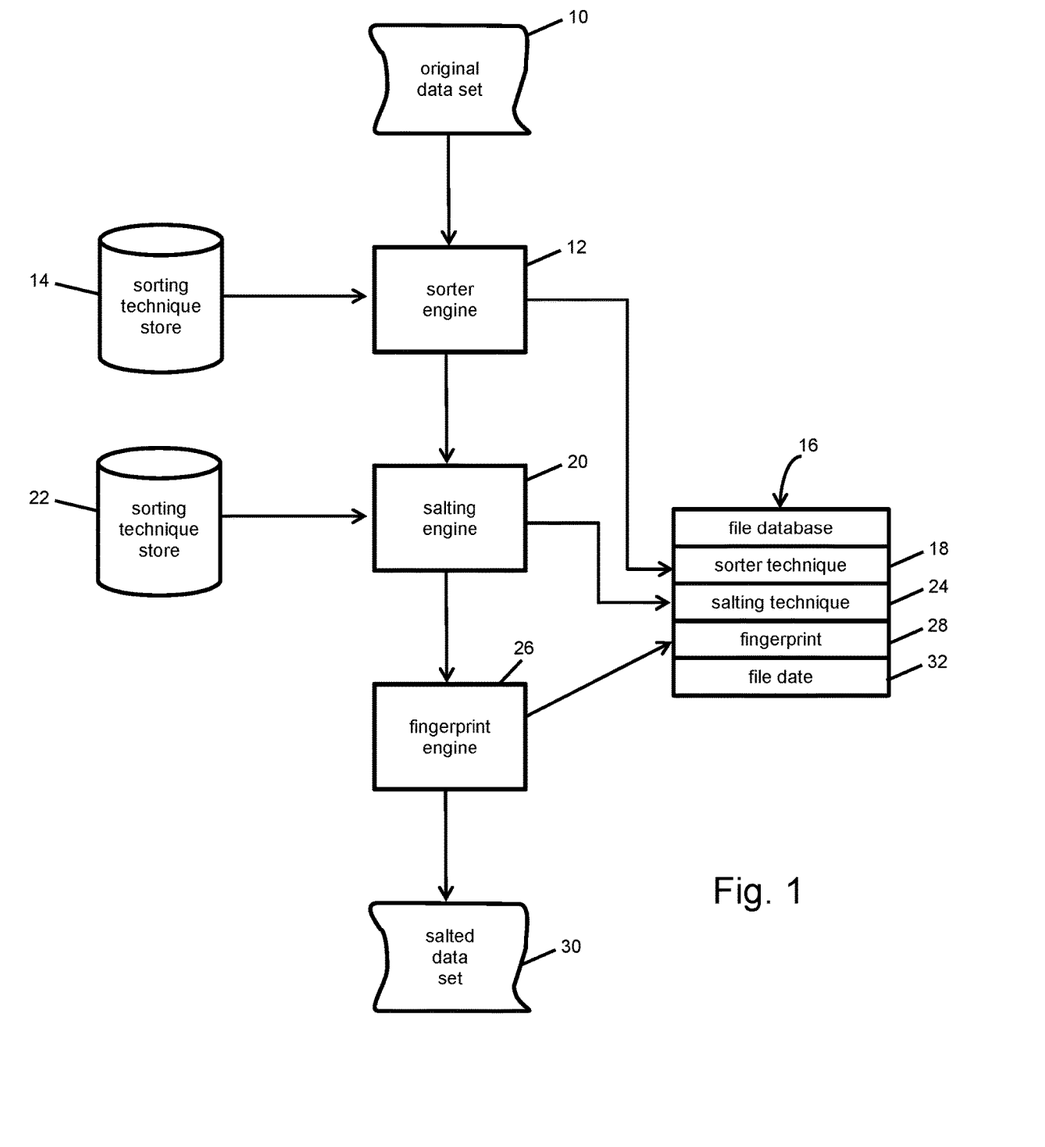
FIG. 1 illustrates the process whereby a Salt is added to a new file or data feed according to an embodiment of the invention.

A file identifier is associated with the file in order to distinguish it from other files created by the Data Owner. The file identifier can be, in various implementations, any string of alphanumerics and/or other characters. In a first step, the information is sorted at sorter engine 12. The sorting technique can be any desired sorting method. The sorting technique can be selected from a multitude of possible sorting techniques stored at sorting technique store 14, in communication with sorter engine 12. The sorting technique is then keyed to the file and stored in file data base 16, along with the file identifier, for that file at sorter technique storage 18. The assignment of a particular sorting algorithm to any given data set may in certain embodiments be randomized. The sorting algorithm may be a sort at multiple levels, i.e., sorting by one field as the primary sort and then sorting by a second field as a secondary sort, to as many levels as desired. In a given example for illustration, the data is sorted first by column H, then by column E, and then by column D. Table 2 provides the results of applying this particular sort to the data of Table 1:

TABLE 2

| # | Col A | Col B | Col C | Col D | Col E | Col F | Col G | Col H |
|---|-------|-------|-------|-------|-------|-------|-------|-------|
| 2 | Rainy | G | Large | 2211 | Tuesday | Yellow | TX | Apple |
| 3 | Cloudy | H | Medium | 209 | Wednesday | Green | TX | Grape |
| 4 | Windy | E | Small | 2301 | Thursday | Blue | TX | Lemon |
| 5 | Calm | M | Very Small | 708 | Friday | White | TX | Lime |
| 1 | Sunny | D | Very Large | 6970 | Monday | Red | TX | Orange |

In the second step, the salting recipe is applied to the sorted data by salting engine 20. The salting recipe is based, at least in part, upon the ordering of the records in the file, and thus the previous sorting step is tied to the results of the salting step. The particular recipe can be chosen from any number of potential recipes stored at salting technique store 22, and, like the sorting technique, can be randomly chosen in certain embodiments. The salting recipe is also keyed to the file, which is stored in file database 16 at salting technique 24. In this particular example, the salting technique is that for every second and third instance of column D starting with the digit "2," the word in column C is abbreviated. Applying this salting recipe to the sorted data of Table 2, the result is shown below in Table 3:

TABLE 3

| # | Col A | Col B | Col C | Col D | Col E | Col F | Col G | Col H |
|---|-------|-------|-------|-------|-------|-------|-------|-------|
| 2 | Rainy | G | L | 2211 | Tuesday | Yellow | TX | Apple |
| 3 | Cloudy | H | M | 209 | Wednesday | Green | TX | Grape |
| 4 | Windy | E | S | 2301 | Thursday | Blue | TX | Lemon |
| 5 | Calm | M | Very Small | 708 | Friday | White | TX | Lime |
| 1 | Sunny | D | Very Large | 6970 | Monday | Red | TX | Orange |

In the third step, a "fingerprint" of the salted data set is captured by fingerprint engine 26. Note that the fingerprint can be any single column or a set of two or more columns in the data. If more than one column is used, the columns need not be adjacent. The fingerprint is not necessarily limited to containing the column that contains salted data, nor is it necessarily required to capture the full depth of the file (i.e., every data item in a column). The fingerprinting recipe, like the sorting technique and the salting recipe, is also keyed to the file in file database 16 at fingerprint technique 28. In the case where the fingerprint that is captured is column C from the above example, the fingerprint will be as shown in Table 4 below:

Table 4

| Fingerprint |
|---|
| L |
| M |
| S |
| Very Small |
| Very Large |

Because the specific sorting technique, the salting recipe, and the fingerprinting recipe are each keyed the file, the data provider can then apply the reverse process (i.e., restore the file to its original order before the application of sorter engine 12) to create a finished salted file as salted data set 30 that can be distributed to TTPs. The result in the finished data file is a salted data file where the salting is disguised from other parties. The result in this particular example is shown in Table 5 below:

TABLE 5

| # | Col A | Col B | Col C | Col D | Col E | Col F | Col G | Col H |
|---|-------|-------|-------|-------|-------|-------|-------|-------|
| 1 | Sunny | D | Very Large | 6970 | Monday | Red | TX | Orange |
| 2 | Rainy | G | L | 2211 | Tuesday | Yellow | TX | Apple |
| 3 | Cloudy | H | M | 209 | Wednesday | Green | TX | Grape |
| 4 | Windy | E | S | 2301 | Thursday | Blue | TX | Lemon |
| 5 | Calm | M | Very Small | 708 | Friday | White | TX | Lime |

In certain embodiments, subsequent issuance of the same data set sent to other customers, or to the same customer later in time, would be subjected to a different combination of the various sorting techniques, salting recipes, and fingerprinting recipes. Each such instance is maintained as a separate file database 16 in a master database or databases. Optionally, a file date 32 may be also included in some or all file databases 16 as additional identifying information for a particular instance of a salted file.

Figure 2:
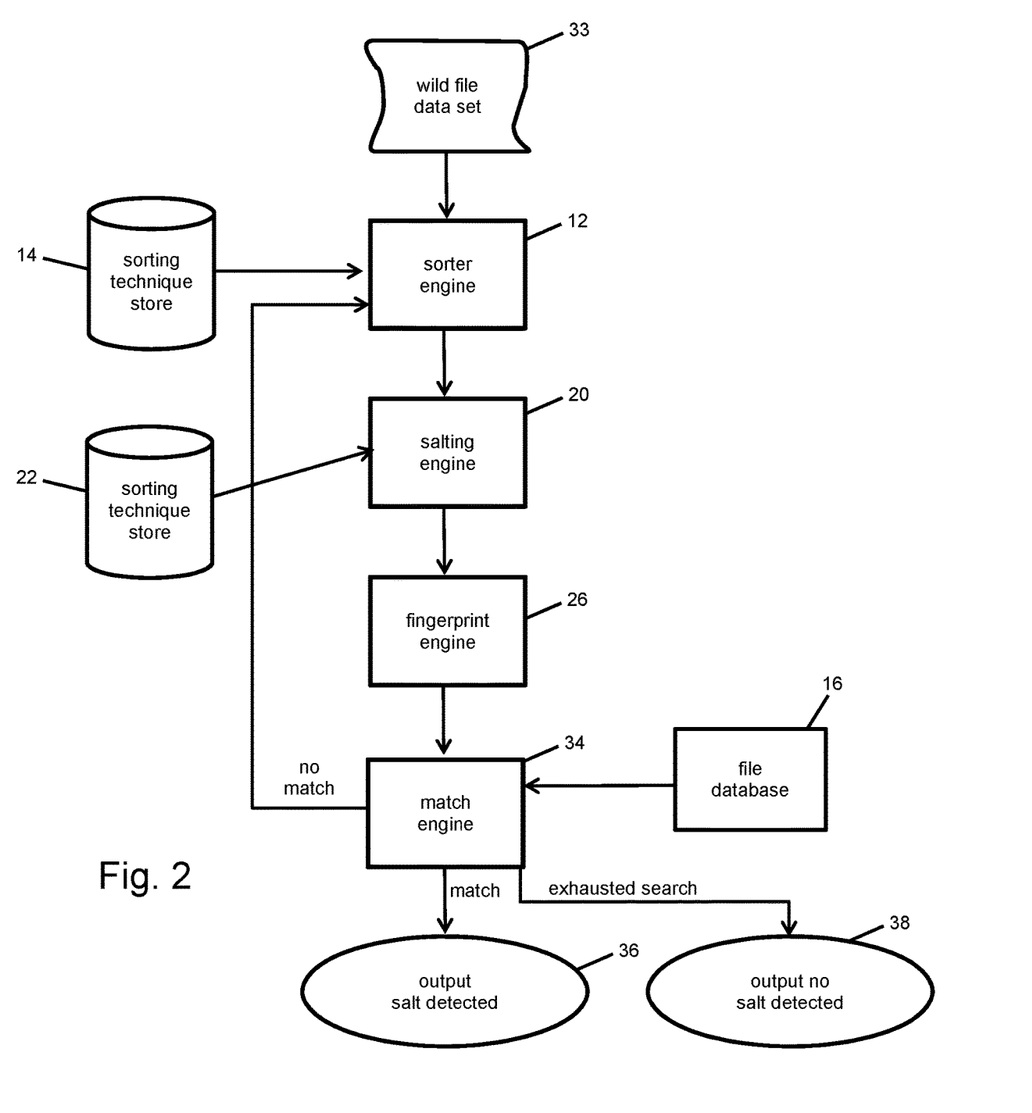
FIG. 2 illustrates the process whereby a file or data feed of unknown origin is analyzed for the presence of a Salt according to an embodiment of the invention.

Referring now to FIG. 2, the process applied when a suspicious file is found "in the wild" as wild file data set 32 to determine if the provider is in fact the source of the file, and if so when the file was created, may be described according to certain implementations. The file is sorted using one of the possible sorting techniques, again with sorter engine 12, and then examined to detect the salt (i.e., the file "DNA") and fingerprint signatures using salting engine 20 and fingerprint engine 26. If the salt and/or fingerprint are not detected, the sort is performed with the next possible sorting technique, and the process is repeated in iterative fashion. The process is repeated, for each sorting technique, with respect to each salting technique, and with respect to each of both for each fingerprint. This process continues until the salt/and or fingerprint is detected at match engine 34, or all possibilities have been exhausted. In the former case it can then be known that the provider is the source of the data, and the output of a salt being detected 36 is created. But in the latter case it can be known that the provider is not the source of the data, resulting in output salt not detected 38. Even if the file has been altered in some way, as explained above, it will be evident that for large files this method will still produce a likelihood of data theft because it would be able to recover "scraps" of the salted data. A score can be determined based on the number of such scraps that are found in the data, at match engine 34, thus leading to a confidence factor for misuse of the provider's data. In any case, the information in file database 16, including the file identifier, can be used to identify the particular data file from which the Wild File was partially or wholly derived.

Various salting methods other than the particular examples described herein may be employed in alternative embodiments. In certain implementations used for consumers or that otherwise involve mailing addresses, the salting method may be compliant with the Coding Accuracy Support System (CASS) standards. CASS enables the United States Postal Service (USPS) to evaluate the accuracy of systems that correct and matches street addresses. CASS certification is offered to all mailers, service bureaus, and vendors that would like the USPS to evaluate the quality of their address-matching systems and improve the accuracy of their ZIP+4, carrier route, and five-digit coding. CASS compliant systems will correct and standardize addresses, and will also add missing address information, such as ZIP codes, cities, and states to ensure the address is complete. In addition, CASS certified systems perform delivery point validation to verify whether or not an address is a deliverable address.

Figure 3:
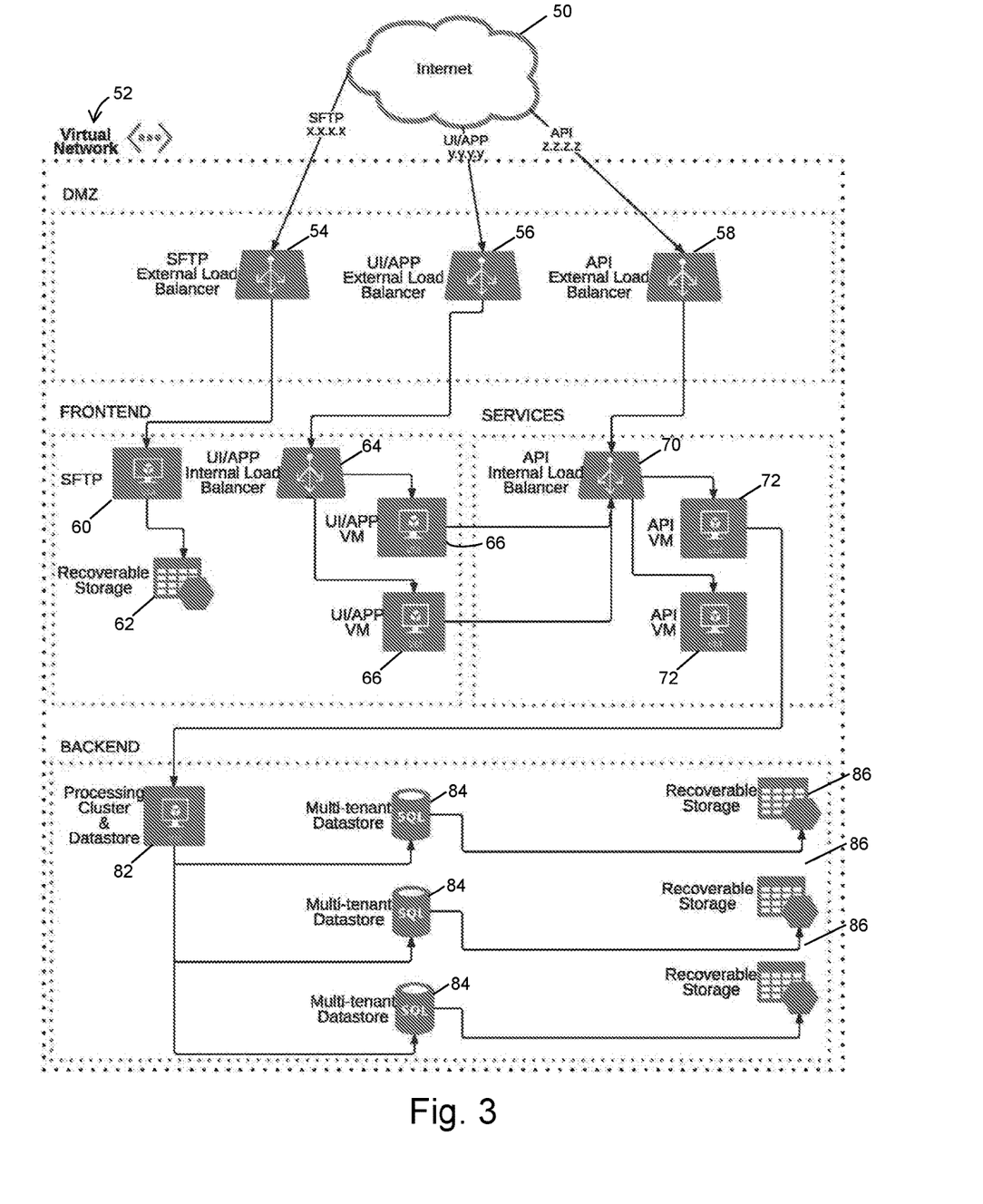
FIG. 3 illustrates the infrastructure and architecture of a salting system according to an embodiment of the invention.

Referring now to FIG. 3, the physical structure for a computer network system to implement the processes described above may now be described. Network 50 (such as the Internet) is used to access the system. A virtual private network (VPN) 52 can be used to provide a secure connection into the "DMZ" area, i.e., the area where outside files or data feeds are quarantined prior to entry behind the system's firewalls. Using a secure file transfer protocol (S FTP) system, files may be transferred to SFTP external load balancer 54; FTP is a well-known network protocol used to transfer computer files between a client and server on a computer network. In addition, data feeds are used to continually stream data into the system through a private protocol or standard protocols (HTTP, HTTPS, etc.) by way of APIs or using customized or standard ports. UI/APP external load balancer 56 may be used to receive files sent by a computer application, and AP external load balancer 58 may be used to receive files or data feeds sent according to an application programming interface (API), which is a well-known concept for developing subroutine definitions, protocols, and tools that allow communications between application software. The load balancers of the system ensure that individual servers in the system are not overloaded with file or data feed requests.

Moving now to the front-end layer of the system, SFTP server 60, associated with its own SFTP server recoverable storage 62, receives files sent by FTP after they pass from the DMZ area. Likewise, UI/APP internal load balancer 64 receives files from the UI/APP external load balancer 56 after they leave the DMZ area, and passes them to one or more UI/APP virtual machines (VMs) 66 (two are shown in FIG. 3). Moving to the services area, these subsystems pass data to API internal load balancer 70, which them passes information to one or more API VMs 72 (again, two are illustrated in FIG. 3).

At the system backend, data from the API VM 72 passes data to processing cluster and datastore 82, which is configured to store data in one or more multi-tenant datastores 84, each of which is associated with a datastore recoverable storage area 86 (three of each are illustrated in FIG. 3). Examples of data stored in multi-tenant datastores 84 include file databases 16, sorting technique store 14, and salting technique store 22.

It may be seen that the described implementations of the invention result in a unique method for determining the recipient of a given data file or feed without making the recipient aware or disrupting the usefulness of the data. In addition, the system is scalable, able to identify the uniqueness of a file or data feed and its recipient amongst a set of potentially millions of Wild Files in circulation, while also providing security for the data ingested by the system. In order to be practical, a commercial-grade watermarking system must be able to process hundreds of files per day, meaning that the entire processing infrastructure must be expandable and scalable. In this age of big data, the size of data files or feeds to be processed ranges significantly, from a few megabytes to several terabytes in size, and the way in which these files or feeds flow into the system can be very unpredictable. In order to construct scalable systems, one must build predictive models to estimate maximum processing requirements at any given time to ensure the system is sized to handle this unpredictability.

The salting system according to the implementations described herein has the capacity of salting data files, database tables, and data feeds of unlimited size. Processing speed, however, is also important, since customers cannot wait days or weeks for watermarking to occur before files are delivered. They may be releasing updates to their underlying data every day and perhaps even faster. The system must be capable of watermarking a file within the cycle time of production of the next file, or else the system will bottleneck and files will fall into a queue that will cause the entire business model to break down. The processing time to detect the watermark in the baseline release is a few seconds. Computing power in most cases is reduced because it is not necessary to parse the complete file and then match the Wild File to the master database to determine whether the Wild File is stolen, except in the worst-case scenario. In addition the search space is further reduced, thus improving processing time, as the detected watermark related to a particular recipient is only required to match against that recipient's files stored in the database. Note, however, that it may be necessary to parse the entire Wild File to ensure that it is not watermarked with data sent to multiple recipients. Regardless, human interaction and examination is not required as part of salt detection using this system. For this reason, further time and cost savings are realized and errors are reduced.

Almost all of the research on data watermarking has been based on algorithms tested for one or two owners of data, and one or two Bad Actors. A commercial-grade system must be able to generate, store and retrieve watermarks for numerous customers and an unknown number of Bad Actors in situations where files with completely unknown sources are recovered. For example, consider that a commercial watermarking company has 5,000 customers for whom it watermarks files. In this example, the watermarking company retrieves a file from a third party who would like to validate that the file contains no stolen data. To determine this, the watermarking company must test the file against each company's watermark until it finds a match. In the worst case, it does not find a match after testing 5,000 times, in which case the only assertion that can be made is that the data has not been stolen from any of the 5,000 owners in the system. The system, according to certain embodiments, does not have limitations to the number of customers and the system is capable of supporting an infinite number of recipients represented in the watermark.

The system and method described herein is a robust mechanism that requires very little time to prove data ownership as opposed to parsing and processing millions of records. In the example of a large data provider, a typical file contains hundreds of millions of records. As the salt applied by this mechanism is invisible, it is impractical and impossible for manual salt identification without any advanced signal processing mechanic that can extract signals out of the noise within a timeframe deemed practical and usable by any business.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. When a grouping is used herein, all individual members of the group and all combinations and subcombinations possible of the group are intended to be individually included. When a range is stated herein, the range is intended to include all subranges and individual points within the range. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention, as set forth in the appended claims.

The invention claimed is:

1. A method for salting and fingerprinting a data file, wherein the data file comprises a plurality of records, and each of such records comprises at least one field, the method comprising the steps of:
   at a sorter engine, selecting a sorting technique from a plurality of available sorting techniques in a sorting technique store;
   at the sorter engine, sorting the records in the data file according to the selected sorting technique;
   at a salting engine, selecting a salting technique from a plurality of available salting techniques in a salting technique store, wherein each of the plurality of available salting techniques comprises alteration of data in a record;
   applying the selected salting technique to one or more records in the data file after the sorting is performed, wherein the salting technique is based, at least in part, upon the order of the records in the data file after the sorting step, to create a salted data file;
   building a fingerprint of the salted data file after the salting step, wherein the fingerprint comprises at least one field of at least a subset of the records in the plurality of records in the salted data file;
   restoring the sorted and salted data file to its original sort order as it was prior to the sorting step to produce a resorted salted data file;
   associating a file identifier with the data file, and storing in a file data base the file identifier along with an identifier associated with the selected sorting technique, an identifier associated with the selected salting technique, and the fingerprint;
   delivering the resorted salted data file to a Trusted Third Party (TTP);
   at the sorting engine, receiving a wild file comprising a plurality of records each comprising at least one field, and applying each of the plurality of sorting techniques from the sorting technique store to the wild file;
   at the salting engine, retrieving each of the plurality of salting techniques from the salting technique store for each of the plurality of sorting techniques applied to the wild file; and
   at a match engine, comparing, for each of the plurality of salting techniques, the results of salting the data file to the wild file to determine if a match occurs, and, if a match occurs after comparing the results of salting the data file to the wild file, comparing at least one field of at least one record in the wild file to the fingerprint, and, if the comparison of the at least one field of at least one record in the wild file to the fingerprint results in a match, returning a result that the wild file was derived from the data file, or, if for each application of one of the plurality of sorting techniques and each application of one of the plurality of salting techniques to the wild file does not result in a match with the fingerprint, returning a result that the wild file was not derived from the data file.

2. The method of claim 1, wherein the selected sorting technique is a multiple-level sorting technique.

3. The method of claim 1, wherein the selected salting technique is randomly chosen from among the plurality of available salting techniques.

4. The method of claim 1, wherein the selected salting technique is compliant with the Coding Accuracy Support System (CASS).

5. The method of claim 1, wherein the salting technique is undetectable by a Bad Actor.

6. The method of claim 1, wherein the salting technique does not impair the usefulness of the data file.

7. The method of claim 1, wherein each record of the data file comprises a plurality of fields, and further wherein each record of the data file comprises information pertaining to a consumer.

8. A method of detecting the presence of one or more records from one of a plurality of data files in a wild file, wherein the plurality of data files and the wild file each comprise a plurality of records each comprising a plurality of fields, the method comprising the steps of:
- selected a plurality of sorting techniques from a set of sorting techniques in a sorting technique store;
- at a sorter engine, applying the plurality of sorting techniques from the sorting technique store to the wild file;
- for each application of one of the plurality of sorting techniques to the wild file, retrieving a plurality of salting techniques from a set of salting techniques in a salting techniques store, producing a plurality of salted data files using the plurality of salting techniques, wherein each of the plurality of available salting techniques comprises alteration of data in a record, and, for each of the plurality of salting techniques, comparing at a salting engine the results of salting at least one of the data files to the wild file to determine if a match occurs with one of the plurality of salted data files;
- at a fingerprint engine, producing a plurality of fingerprints, wherein each of the plurality of fingerprints is produced from at least one field of at least one record of each of the salted data files;
- at a match engine, comparing the results of salting the at least one data file to the wild file;
- if a match occurs after comparing the results of salting the at least one data file to the wild file, comparing at least one field of at least one record in the wild file to at least one of a plurality of fingerprints;
- if the comparison of the at least one field of at least one record in the wild file to at least one of the plurality of fingerprints results in a match, returning a result that the wild file was derived from the data file; and
- if for each application of one of the plurality of sorting techniques and each application of one of the plurality of salting techniques to the wild file does not result in a match with the fingerprint, returning a result that the wild file was not derived from the data file.

9. The method of claim 8, wherein at least one of the plurality of sorting techniques is a multiple-level sorting technique.

10. The method of claim 8, wherein at least one of the plurality of salting techniques is compliant with the Coding Accuracy Support System (CASS).

11. A system for salting and fingerprinting a data file, wherein the data file comprises a plurality of records, and each of such records comprises at least one field, comprising:
- a sorter engine configured to receive a data file, wherein the data file comprises a plurality of records each comprising at least one field, and wherein the sorter engine is configured to sort the records in the data file according to a sorting technique to produce a sorted data file, and to resort the sorted data file back to its original order to produce a resorted data file, and further wherein the sorter engine is configured to receive a wild file comprising a plurality of records each comprising at least one field;
- a sorting technique store in communication with the sorter engine, wherein the sorting technique store comprises a plurality of sorting techniques, and further wherein the sorter engine is further configured to apply each of the plurality of sorting techniques to the wild file;
- a salting engine in communication with the sorter engine and configured to receive the sorted data file and apply a salt to the sorted data file according to a salting technique to produce a salted data file;
- a salting technique store in communication with the salting engine, wherein the salting technique store comprises a plurality of salting techniques wherein each of the plurality of salting techniques comprises alteration of data in a record, and wherein the salting engine is further configured, for each application of one of the plurality of sorting techniques to the wild file, to retrieve each of the plurality of salting techniques from the salting technique store;
- a match engine configured to, for each of the plurality of salting techniques, comparing the results of salting the data file to the wild file to determine if a match occurs;
- a fingerprint engine in communication with the salting engine configured to produce a fingerprint from at least one field of at least one record of the salted data file and, if a match occurs after comparing the results of salting the data file to the wild file, compare at least one field of at least one record in the wild file to at least one of a plurality of fingerprints, and, if the comparison of the at least one field of at least one record in the wild file to at least one of the plurality of fingerprints results in a match, returning a result that the wild file was derived from the data file, or, if for each application of one of the plurality of sorting techniques and each application of one of the plurality of salting techniques to the wild file does not result in a match with at least one of the plurality of fingerprints, returning a result that the wild file was not derived from the data file; and
- a file database in communication with the sorter engine, the salting engine, and the fingerprint engine, wherein the file database is configured to store a data file identifier, a selected sorting technique identifier, a selected salting technique identifier, and the plurality of fingerprints.

12. The system of claim 11, wherein at least one of the plurality of sorting techniques at the sorting technique store is a multiple-level sorting technique.

13. The system of claim 11, wherein the sorter engine is further configured to randomly select the selected salting technique from among the plurality of available salting techniques at the salting technique store.

14. The system of claim 11, wherein at least one of the plurality of salting techniques at the salting technique store is compliant with the Coding Accuracy Support System (CASS).

15. The system of claim 11, wherein each record of the data file comprises a plurality of fields, and further wherein each record of the data file comprises information pertaining to a consumer.

* * * * *